Feb. 28, 1950 W. V. BAKER 2,498,718
AIR WASHER
Filed Sept. 20, 1945 3 Sheets-Sheet 1
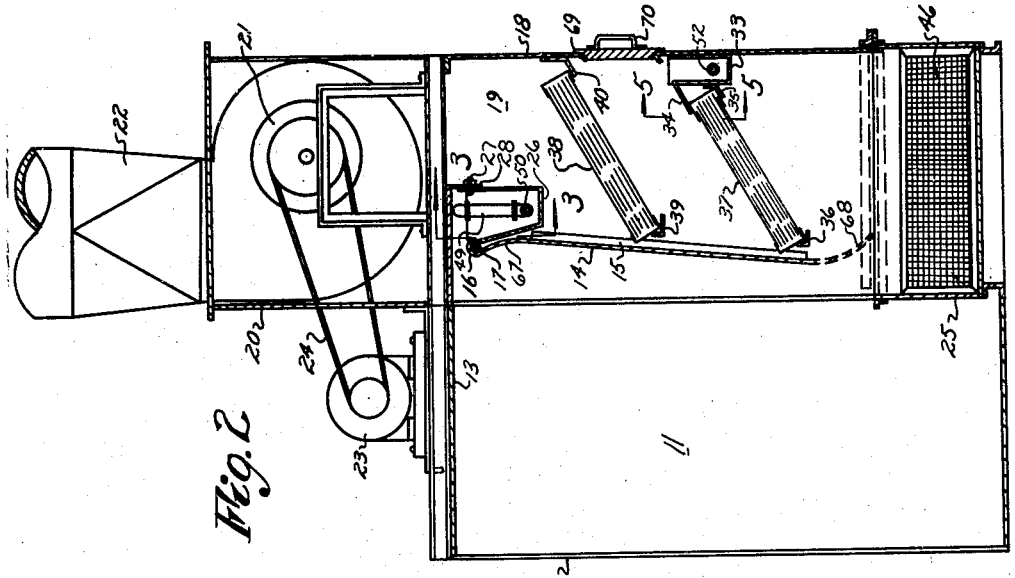
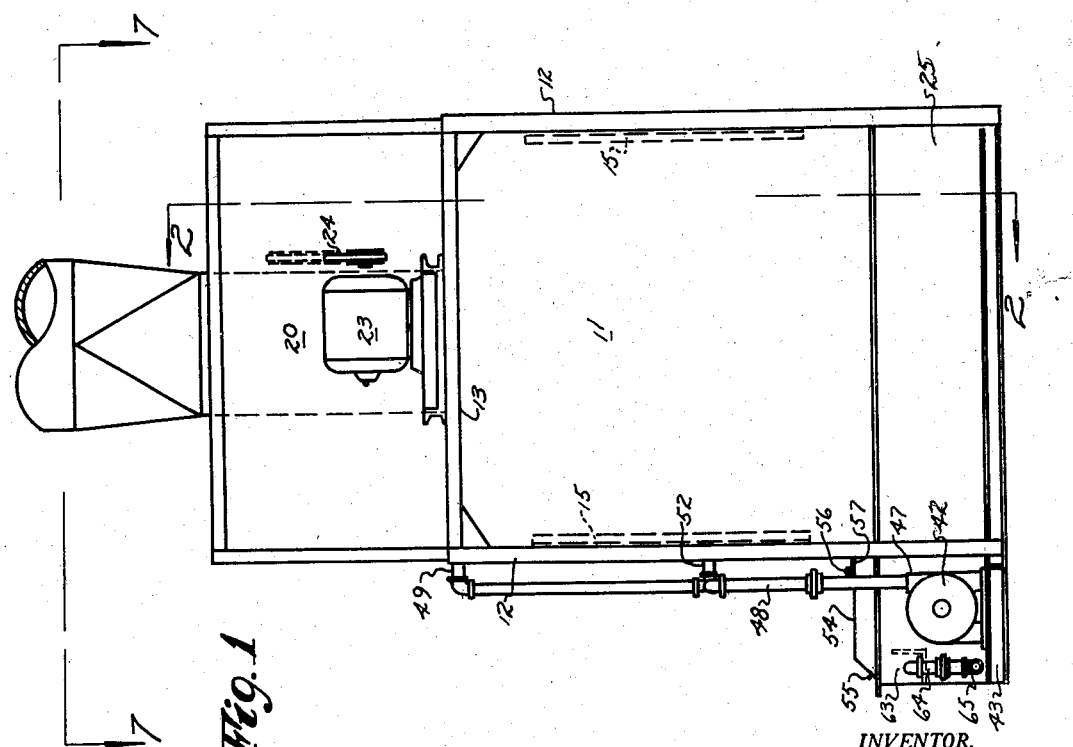
INVENTOR.
WEDWORTH V. BAKER
BY Robert A. Sloman
ATTORNEY

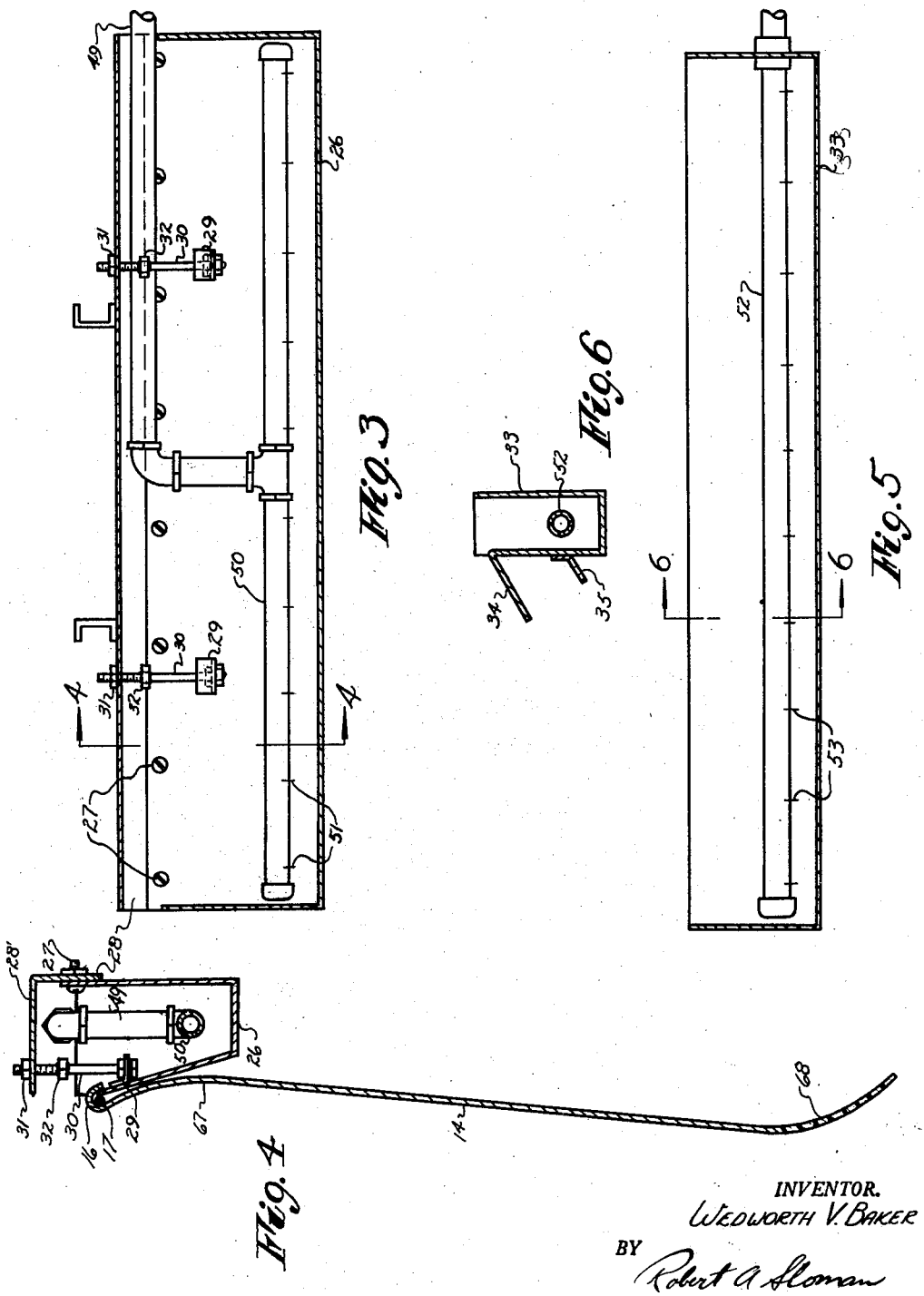

Feb. 28, 1950 W. V. BAKER 2,498,718
AIR WASHER

Filed Sept. 20, 1945 3 Sheets-Sheet 3

INVENTOR.
WEDWORTH V. BAKER
BY
Robert A. Sloman
ATTORNEY

Patented Feb. 28, 1950

2,498,718

UNITED STATES PATENT OFFICE 2,498,718

AIR WASHER

Wedworth V. Baker, Detroit, Mich., assignor to Detroit Sheet Metal Works, Detroit, Mich., a corporation of Michigan Application September 20, 1945, Serial No. 617,620

2 Claims. (Cl. 183—13)

This invention relates to improvements in air washers, and more particularly to washers incorporating fluid means for carrying and washing away excess paint during a spray painting operation, for carrying away dust during a grinding operation, or for removal of other air-borne particles or impurities.

It is the object of the present invention to provide means whereby the excess paint spray or vapor, for example, is conducted through the washer, together with means for filtering out the greater portion of wasted paint pigment which can be rectified and re-used if desired.

It is the further object herein to provide wet and dry filtering means in conjunction with air suction means in a stack forming a part of said washer, whereby the air exhausted is substantially free of paint pigment, air-borne particles, or other impurities.

It is the further object of this invention to provide a flood sheet of irregular shape within the washer housing, together with a flood tank whereby the surface of said flood sheet has a continuous water surface for receiving and carrying substantially all excess spray paint or other impurities to a tank and/or through a plurality of filters for subsequent direction to a tank.

It is the further object of this invention to provide an air washer with an exhaust compartment in communication with a stack having a suction means, with said compartment having a wet filter and a dry filter in spaced relation, and with a flood tank associated with said wet filter.

It is the further object herein to provide a fluid storage tank associated with said washer for collecting the fluid running off said flood sheet, as well as the fluid flowing through and running off said wet filter, together with fluid pumping means in communication with said tank for supplying fluid to a flood sheet tank and to the wet filter flood tank.

These and other objects will be seen from the following specification and attached drawings in which:

Fig. 1 is a front elevational view of the washer.

Fig. 2 is an elevational section on line 2—2 of Fig. 1.

Fig. 3 is an elevational section of the flood sheet flood tank.

Fig. 4 is a section on line 4—4 of Fig. 3 and including the flood sheet.

Fig. 5 is an elevational section of the filter flood tank.

Fig. 6 is a section on line 6—6 of Fig. 5.

Figure 8:
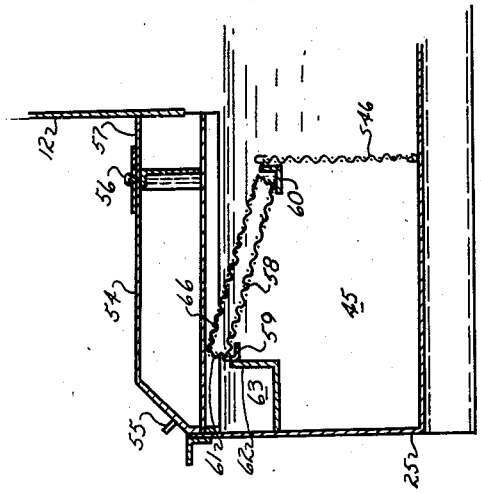
Fig. 8 is a fragmentary elevational section of the fluid storage tank.

While the invention disclosed herein generally includes air washers, the following description particularly specifies the detail, construction and operation of a spray booth as one praticable adaptation of the invention, only by way of example.

It is distinctly understood that the air washer hereinafter described has numerous adaptations and uses in conjunction with the removal of air-borne particles or impurities, within the scope of the claims hereafter set out.

Referring to the drawings, a spray booth or washer is shown in Figs. 1 and 2 comprising an open hooded spray painting compartment 11, with side walls 12 and top wall 13. Removable flood sheet 14 angularly rests at its side edges upon the spaced angularly arranged supporting members 15 carried on the inner surface of side wall members 12 as illustrated. Said flood sheet is also supported within the spray booth by its upper curved portion 16 which rests upon transverse shaft 17, the ends of which are secured to side walls 12.

Said spray booth has a rear wall 18 with an exhaust filtering chamber 19 being provided between said rear wall and flood sheet 14. A hollow stack compartment 20 is provided upon the top of the washer above and in communication with filter chamber 19. A suction fan 21 is positioned in said compartment with its outlet joined in communication with exhaust stack 22. Motor 23 mounted upon the top of spray compartment 11 is joined by pulley belt 24 to said suction fan for effecting the desired air circulation from compartment 11 to compartment 19, which is separated therefrom merely by flood sheet 14. It will be understood that compartment 11 is open at its left end, so that air is free to enter compartment 11 for transmittal to compartment 19, and exhausting through stack 22.

It will be understood that while a suction fan is illustrated, any other suitable means such as a compressor, blower, or injector may be employed for effecting air circulation through the air washer.

Fluid storage tank 25 is positioned within the washer housing below flood sheet 14 and filter chamber 19, whereby fluid flowing off of said flood sheet descends directly into said tank.

Referring to Figs. 2, 3 and 4, flood tank 26 is bolted along its rear wall at 27 to member 28 which depends from the top wall portion 28'. The front wall of said tank has flanges 29 to which are secured bolts 30 which extend from and are adjustably secured by nuts 31 to top wall portion 28'. Nuts 32 welded to bolts 30 provide means for rotating said bolts for effecting vertical adjustments of opposite ends of the tank front wall to attain a uniform overflow of water from said tank and onto the entire top edge of flood sheet 14.

Water overflowing flood tank 26 follows the irregular contour of said flood sheet and drops into tank 25 in the manner shown in Fig. 2.

A secondary flood tank 33, suitably secured to rear wall 18 of the spray booth, has a longitudinal and angularly bent overflow lip 34 as shown in detail in Fig. 6. Flange 35 extends from tank 33 in parallel spaced relation to overflow lip 34. Angle member 36 extending below and parallel to flange 35 is positioned within chamber 19 and secured at its opposite ends to side walls 12. Said angle member cooperating with flange 35 provides an angular support for the filter pack 37 which extends entirely across chamber 19. Said filter is preferably constructed with a plurality of fibreglass mats, however any other suitable filtering means may be employed.

A secondary eliminator filter pack 38 is also angularly positioned in chamber 19 parallel to filter pack 37. Its lower edge rests on angle member 39 which extends parallel to angle member 36 and is similarly secured to sidewall member 12, while its upper edge rests upon a corresponding flanged member 40 which angularly extends from rear wall 18.

Fluid overflowing tank 33 runs down on wet filter pack 37 and through the same dropping into tank 35, while a portion of said fluid engages the inner wall of flood sheet 14 and is thence directed into said tank.

Figure 7:
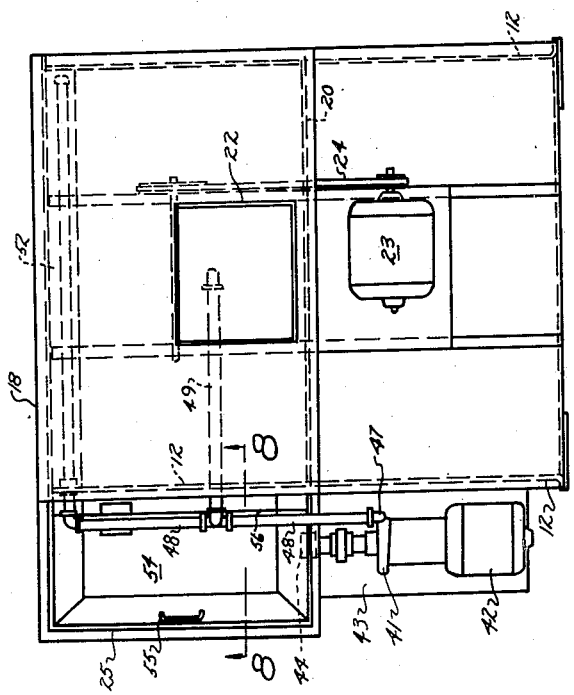
Fig. 7 is a top plan view of Fig. 1.

Referring to Figs. 1 and 7, fluid pump 41 and its driving motor 42 are supported on base portion 43 forming a part of the spray booth housing; and the pump intake 44 is shown in Fig. 7 as extending into portion 45 of fluid tank 25, shown in detail in Fig. 8.

Portion 45 is separated from the balance of tank 25 by the transverse wire screen 46 which prevents solids or other impurities from being drawn into pump 41. Fluid is discharged at 47 and directed up through pipe 48 and into pipe 49 which extends into the top portion of flood tank 26. Said latter pipe centrally joins longitudinal outlet pipe 50 which is perforated at 51 throughout its length for distributing water within tank 26. Fluid overflowing tank 26 descends along the surface of flood sheet 14 and drops into tank 25.

Fluid is also delivered through pipe 48 and into pipe 52 which extends into flood tank 33 and which is also perforated at 53 as shown in Fig. 5. Water overflowing said tank flows over lip 34 and down over and through wet pack filter 37 and thence into tank 25 below.

Referring to Figs. 1 and 8, it is seen that access to chamber 45 is provided by tank cover 54 with handle 55, hinged at 56 to member 57 forming a part of the air washer housing.

The removable sludge skimming basket 58 of wire mesh construction is shown in Fig. 8 positioned in compartment 45 of tank 25 with one longitudinal edge resting upon angle member 60 positioned between the walls of said tank. An opposite longitudinal edge of basket 58 rests upon ledge 59 on longitudinal wall 62 forming a part of overflow chamber 63.

It will be noted that the sides as well as the top portion of sludge basket 58 are also constructed of wire mesh preferably of 8 mesh #16 wire. As shown in Fig. 1, overflow compartment 63 is provided with drain pipe 64 joined thereto, having outlet 65 for safely maintaining a suitable fluid level within tank 25.

Excess paint pigment not caught by the article sought to be spray painted within hood 11, is washed down flood sheet 14 and into tank 25, while the portion thereof not washed down directly into said tank is drawn into compartment 19 by suction fan 21 and upwardly through wet filter pack 37. Most of the pigment is caught in said filter and washed down into the tank by means of water which is continually overflowing tank 33 and washing down through filter pack 37. Any pigment not caught continues upwardly and is substantially caught by eliminator filter pack 38, thus guaranteeing almost a pure pigment-free exhaust up through stack 22. Paint pigment washed down into tank 25 floats on the top of the water therein and collects in wire mesh sludge basket 58.

From time to time, cover 54 may be opened and sludge basket 58 manually removed for disposal and/or rectification of the pigment sludge therein.

It will be noted that sludge basket 58 has its top screened portions 66 extending above the desired fluid level whereby the fluid overflow into overflow compartment 63 has to pass through the screening forming a part of said basket. Thus substantially all pigment is retained within sludge basket 58, which may be intermittently removed or replaced in the manner above described.

Referring to Fig. 4, it will be seen that flood sheet 14 is curved at 67 as well as at 68, and that the curved portion 68 is meshed preferably a ¾" mesh with said mesh being formed in expanded flattened metal.

Referring to Fig. 2, a trap door 69 is shown which may be manually removed from rear wall 18 by means of handle 70 thereby providing access to the interior of chamber 19 permitting removal or exchange of filter packs 37 and 38.

It will be noted in the removal of non-floating airborne particles that the same may collect at the bottom of tank 25; however, it is seen that screen 46 prevents such particles from entering the fluid pumping chamber 45.

Having described my invention, reference should now be had to the claims which follow for determining the scope thereof.

I claim:

1. In an air washer having a housing and a flood sheet therein defining receiving and exhaust chambers on opposite sides thereof, a stack in communication with said exhaust chamber, air suction means in said stack, a fluid tank in said housing below said flood sheet and exhaust chamber, a flood tank adapted to overflow on said flood sheet, a plurality of angularly arranged parallel spaced filters in and extending entirely across the opening in said exhaust chamber, and a secondary flood tank in said exhaust chamber adapted to overflow on and through one of said filters.

2. In an air washer having a housing and a fluid tank therein, a horizontal bar joined at its ends to the inner side walls of said housing, an irregularly shaped flood sheet having an inwardly curved upper lip removably suspended upon said bar within said housing defining spray and exhaust compartments on opposite sides thereof, a stack in communication with said exhaust compartment, air suction means in said stack, a flood tank adjustably supported within and from the top of said housing adapted to overflow on said flood sheet, a plurality of angularly inclined parallel spaced filters positioned within said exhaust compartment and extending entirely across the opening therein, a secondary flood tank carried within and on the rear wall of said housing adapted to overflow on and through the lower of said filters, and means for pumping fluid from said fluid tank to said flood tanks.

WEDWORTH V. BAKER.

REFERENCES CITED

The following references are of record in the file of this patent:

UNITED STATES PATENTS

| Number | Name | Date |
| --- | --- | --- |
| 1,434,301 | Liljegran | Oct. 31, 1922 |
| 1,564,075 | Lakin | Dec. 1, 1925 |
| 2,197,004 | Myers | Apr. 16, 1940 |
| 2,227,465 | Roche, Jr., et al. | Jan. 7, 1941 |
| 2,234,735 | Lambert et al. | Mar. 11, 1941 |
| 2,316,491 | Teichner | Apr. 13, 1943 |
| 2,353,548 | Dalton | July 11, 1944 |